UNITED STATES PATENT OFFICE.

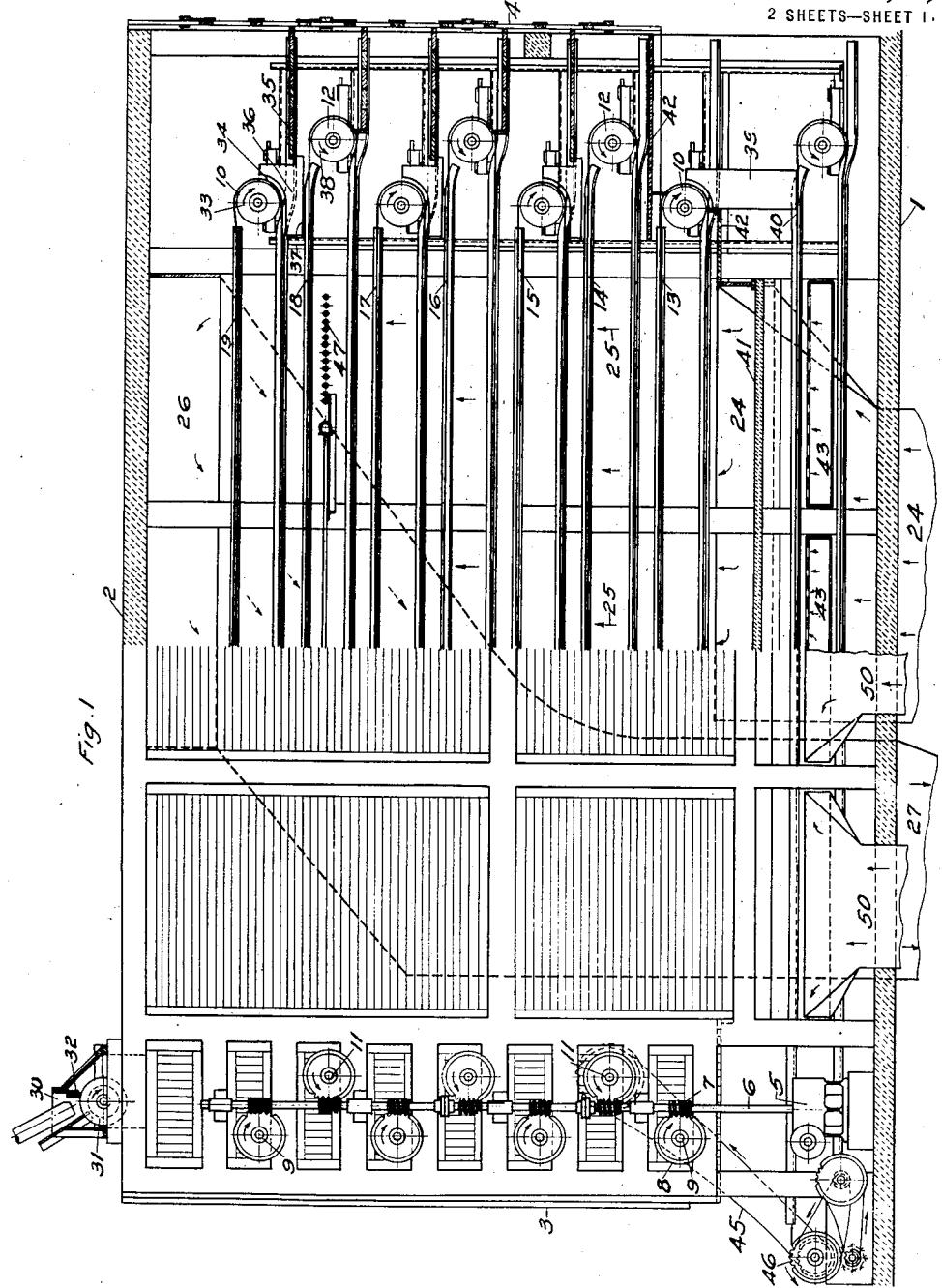

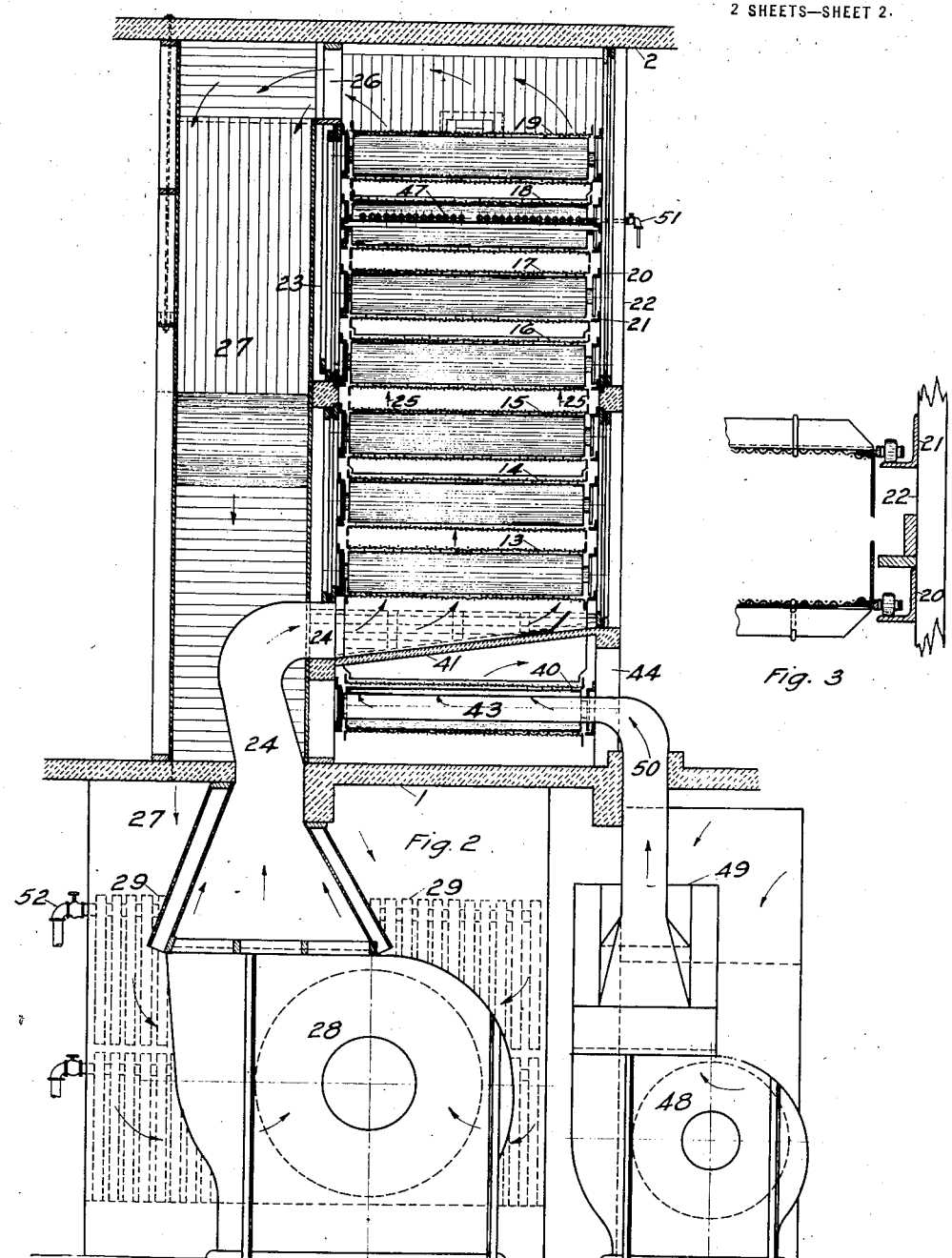

THOMAS B. HUNTER, OF SAN FRANCISCO, CALIFORNIA.

FRUIT-DRIER.

1,370,211.    Specification of Letters Patent.    Patented Mar. 1, 1921.

Application filed January 26, 1920. Serial No. 353,916.

*To all whom it may concern:*

Be it known that I, THOMAS B. HUNTER, a citizen of the United States, and resident of the city and county of San Francisco, State of California, have invented new and useful Improvements in Fruit-Driers, of which the following is a specification.

My invention has for its principal object the drying of fruit, and other food products, rapidly and efficiently so that they will retain the best qualities, and also during the treatment will thoroughly dry to a brittle condition any adhering small stems. It is particularly adapted to raisin drying, and will produce the raisins properly dried and with the small cap-stem thoroughly dried to a brittle condition so that their removal from the raisins is quickly and easily thereafter accomplished in the well known cap-stemming machine.

Other objects will appear from the description which follows:

These results I accomplish by passing the fruit on perforated belts or wire cloth drapers through a compartment in which there is being passed hot air, and I prefer to use a plurality of such drapers, the fruit or material being passed by gravity over the consecutive drapers until it has arrived at a proper condition, after which it is preferably subjected to a quick cooling action by a current of air on another draper and in another compartment.

In the first or hot air compartment the rate of drying must be such as not to injure the skin qualities and therefore involves a definite period of time, depending upon various conditions, as the condition of the fruit, the size of the pieces, hydroscopic condition of the air, etc.

During the passage of the heated air through the draper belts it loses some of its heat, and in order that the treatment may be efficient throughout the full compartment I introduce a reheater between the drapers. The wire cloth permits the free passage of air in and around all of the fruit units, and their transfer from one draper to the next thoroughly stirs them up.

In the drying of raisins, and with particular reference to the preparation for cap-stemming, the cap-stems are thoroughly dried and the transfer through a cooling air current while being passed on another draper and in another compartment, conditions the raisins and stems so that they will separate in the later treatment in the capstemmer.

By referring to the accompanying drawings my invention will be made clear.

Figure 1 is the side elevation of my drier with the parts shown in several sections and views to illustrate its construction and operation.

Fig. 2 is an end section with certain of the parts removed and showing the air circulating means.

Fig. 3 is a detail of a portion of Fig. 2 showing the tracking portions of one of the drapers.

Throughout the figures the same numerals refer to similar parts.

In the drawings and description which follows, my invention is shown as applied particularly to apparatus constructed for raisin drying.

The numeral 1 indicates the base of the machine, and in the illustration is shown as the concrete floor of the building.

Numeral 2 indicates the top wall, whereas 3 and 4 are end walls respectively.

A driving motor 5 is provided for operating the machine, which operation is accomplished through the vertical shaft 6, worms and worm wheels 7 and 8, which latter are mounted upon shafts 9, 9. Mounted on these shafts 9, 9 are rollers corresponding with the rollers 10, 10 at the opposite end of the machine. It will be noted that there are also a set of shafts 11, 11 and corresponding opposite rollers 12, 12 also driven in the same manner and differing only from the first mentioned rollers in their relative locations.

Disposed about each pair of rollers opposite to each other are drapers indicated at 13, 14, 15, 16, 17, 18, 19, which travel to side supporting angle irons, better shown in Figs. 2 and 3, as at 20, 21, which latter are mounted upon the side walls or frame as 22, 23.

Dry or heated air is admitted through the base of the machine as at 24 and passes upwardly through the belts or drapers, which are preferably made of a porous material, as wire netting, or screen, or chain type of draper, well known in the art. It will thus be seen that air susceptible of taking up moisture may pass upwardly through these belts and come into contact with material carried thereon, and that during its upward passage as shown by the arrows 25, 25 it may absorb freely the moisture contained in said material, and find egress at the top of the machine through the port 26, and thence return through the passageway 27, to the supply inlet of the circulating fan 28. During its said passage it comes into contact with the heating element, as the steam coil 29 and thence the greater portion is returned through the inlet 24 for further drying.

The material to be dried is introduced through the hopper 30, and is fed by the rotating feeding roller 31, by the depending curtain or partition 32, and thence falls upon the draper 19. From here it is carried in the direction of the arrow 33, and passes through the opening at 34, which I make narrow, and which may be provided with a curtain to serve as an air seal. From here the material drops through the partition 35, in which a suitable opening 36 is left, and thence on to the draper 18, passing also the depending curtain, or partition member, as 37 so that from this point it is received on the draper 18, which is operated in the direction of the arrow 38, thus again bringing the material into exposure to the circulating air.

The material is now transferred back to the entrance end by the draper 18, and again passed through a dumping and transferring end structure, as previously described, thus arriving upon the draper 17, which travels in a reverse direction, again exposing the material to the drying effect of the hot air passing therethrough, and from here it is transferred to the draper 16; thence to the draper 15, thence to the draper 14; and thence to the draper 13, in the same manner and by the same means as described in connection with its transfer from draper 19 to draper 18. During this prolonged exposure, in some instances occupying hours, and in other cases but a fraction of an hour, the capstems and the raisins are properly conditioned, and they are now transferred from the draper 13 through the narrow slot and chute 39, thus arriving upon the draper 40, mounted in a separate compartment. This draper is divided from the plurality of drapers above described by the partition floor 41, 42, and is exposed to the circulation of cold air, which is introduced through the ducts 43, 43 and passes upwardly through the draper and around the material and out through the duct 44, chilling the raisins and their capstems quickly, so as to make the separation of the capstems from the raisins more efficient, and with greater facility.

The driving of the draper 40 is effected by similar means as by the connections shown at 45, which may be from the same source of power 5, or independent thereof.

The draper 40 is arranged to pass through and out of the main housing wall 3 as over the delivery drum 46, from which the raisins with their capstems are delivered for final treatment in the capstemming machine. To secure the best results in the drying it is apparent that the rising-moisture-absorbing air through the drapers 13, 14, 15 will lose a portion of its absorptive capacity as it ascends, due to the moisture which it has absorbed and the temperature which it has lost in its path. In order to restore its absorptive power during the latter part of the treatment, it is reheated as by the steam coil 47, suitably located to provide by "compounding" an increased capacity for absorption of further moisture. It will be apparent that there will be a leakage of the circulating air through the inlet hopper connections as at 32 and through the outlet hopper connections as at 39, and through the outlet in the wall 3 for the draper 40, and in practice I find that it is not necessary to supply any additional fresh air in the circulation from the ports 24 and the ports 26 than that which is dissipated through the above mentioned outlets, my reheater coil 47 being an efficient means of providing the additional heat absorbing capacity requisite in the circulating air, thus accomplishing the most efficient drying.

It is to be understood that all of the essential, well known operating mechanism by which suitable lubrication, efficient driving, draper tightening means, side doors for access to the interior structure, tracking means for the drapers, and cross connected driving means, as chain drives, from the drums and shafts 9 and 11 to the drums 10 and 12, may be provided as required; also that any well known ways, and well known means of limiting the circulation as far as may be desired, is to be provided for the air path through the drapers.

Attention is, however, directed to the air leakage through the inlets and outlets in the drier walls, which are preferably not to be sealed against said leakage, as the discharge of a portion of the air from the drier housing, and the restoration by added air to make up for said abstraction is an advantage.

In the design here shown I have provided at 48 a cold air blower, supplying the cold air through the duct 43, through the connections 49, 50.

It is to be understood that the fan 28 and the blower 48 are to be driven by well known means, not shown, and that within the air paths may be provided suitable thermometers, hygrometers, and such other instruments as may be required; also that the heat coils 47 and 29 through their connections as 51, 52 are to be supplied with heat from any suitable source; also that while I have shown my drier as built between the two building floors 1 and 2, which floors form the base and top of the drier, and have shown the fan and blower as located on the floor below, they may be located in any well known position, and with any suitable connections to the drier inclosure.

Reference is herein made to my co-pending application Serial 354,130, filed January 26, 1920, on method of preparing and packing raisins, wherein is set forth certain other description and claims of my invention.

I claim:

1. In a fruit drier, a traveling belt of porous structure, constructed and adapted to transport the material to be dried; means for receiving and distributing the material on the belt adjacent to one end thereof; heating means disposed below said belt; a second belt below said heating means of porous structure positioned to receive the material discharged from the discharge end of the first named belt to convey the material in a reverse direction; mechanism by which the belts are caused to travel, and a compartment substantially inclosing said belts and said heating means, said compartment having any outlet positioned for discharging the material from the second named belt; an inlet for air below the second named belt, and an air outlet above the top named belt, and means for forcing heated air into the said air inlet, said outlet discharging the heated and dried material on to a third belt of porous structure, and means causing cold air to pass therethrough.

2. In a fruit drier a traveling belt of porous structure, constructed and adapted to transport the material to be dried; means for receiving and distributing the material on the belt adjacent to one end thereof; heating means disposed below said belt; a second belt below said heating means of porous structure positioned to receive the material discharged from the discharge end of the first named belt to convey the material in a reverse direction; mechanism by which the belts are caused to travel, and a compartment substantially inclosing said belts and said heating means, said compartment having an outlet positioned for discharging the material from the second named belt; an inlet for air below the second named belt, and an air outlet above the top named belt, and means for forcing heated air into the said air inlet, said discharge outlet admitting the passage of the material by gravity to a third belt of porous structure mounted in an adjacent compartment; air inlet and outlet ports in the last named compartment and positioned to cause circulating air to contact with and cool said material, and blower means supplying cold air to said inlet port.

3. In a fruit drier, a plurality of traveling belts of porous structure, constructed and adapted to transport the material to be dried; means for receiving and distributing the material on the belts adjacent to one end thereof; heating means disposed below said belts; a second plurality of belts below said heating means of porous structure positioned to receive the material discharged from the discharge end of the first named belts to convey the material in a reverse direction; mechanism by which the belts are caused to travel, and a compartment substantially inclosing said belts and said heating means, said compartment having an outlet positioned for discharging the material from the second named belts; an inlet for air below the second named belts, and an air outlet above the top named belts, and means for forcing heated air into the said air inlet, the belts adapted to travel in directions to continually pass the material from the inlet of the first named compartment to an outlet constructed in the second compartment.

4. In a fruit drier, a plurality of traveling belts of porous structure, constructed and adapted to transport the material to be dried; means for receiving and distributing the material on the belts adjacent to one end thereof; heating means disposed below said belts; a second plurality of belts below said heating means of porous structure positioned to receive the material discharged from the discharge end of the first named belts to convey the material in a reverse direction; mechanism by which the belts are caused to travel, and a compartment substantially inclosing said belts and said heating means, said compartment having an outlet positioned for discharging the material from the second named belts; an inlet for air below the second named belts, and an air inlet above the top named belts, and means for forcing heated air into the said air inlet, said outlet discharging the heated and dried material on to a third belt of porous structure, and means causing cold air to pass therethrough, the belts adapted to travel in directions to continually pass the material from the inlet of the first named compartment to an outlet constructed in the second compartment.

5. In a fruit drier, a plurality of belts of porous structure, in series, constructed and adapted to transport the material to be dried; means for receiving and distributing the material on the first belt of said series; heating means disposed below said belt; a second plurality of belts below said heating means of porous structure positioned to receive the material discharged from the discharge end of the first named belts to convey the material in a reverse direction; mechanism by which the belts are caused to travel, and a compartment substantially inclosing said belts and said heating means, said compartment having an outlet positioned for discharging the material from the second named belts, and an air outlet above the top named belts, and means for forcing heated air into the said air inlet, said discharge outlet admitting the passage of the material by gravity to a third belt of porous structure mounted in an adjacent compartment; air inlet and outlet ports in the last named compartment and positioned to cause circulating air to contact with and cool said material, and blower means supplying cold air to said inlet port, the belts adapted to travel in directions to continually pass the material from the inlet of the first named compartment to an outlet constructed in the second compartment.

In testimony whereof I have hereunto set my hand at San Francisco, California, this 20th day of January 1920.

THOMAS B. HUNTER.